(12) United States Patent
Miyazaki et al.

(10) Patent No.: US 7,692,408 B2
(45) Date of Patent: Apr. 6, 2010

(54) CHARGING DEVICE AND RECHARGEABLE POWER TOOL SET

(75) Inventors: Hiroshi Miyazaki, Hikone (JP);
Toshiharu Ohashi, Maibara (JP);
Masatoshi Ito, Yokohama (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 524 days.

(21) Appl. No.: 11/390,209

(22) Filed: Mar. 28, 2006

(65) Prior Publication Data
US 2006/0214642 A1 Sep. 28, 2006

(30) Foreign Application Priority Data
Mar. 28, 2005 (JP) .............. 2005-092393

(51) Int. Cl.
*H02J 7/04* (2006.01)
(52) U.S. Cl. .............. 320/150; 320/106; 320/128
(58) Field of Classification Search .............. 320/106, 320/107, 110, 112, 111, 113, 114, 115, 119, 320/128, 134, 136, 144, 150, 153; 429/96, 429/97, 98, 99, 100
See application file for complete search history.

(56) References Cited

U.S. PATENT DOCUMENTS

| | | | | |
|---|---|---|---|---|
| 5,742,149 A | * | 4/1998 | Simpson | 320/113 |
| 5,844,400 A | * | 12/1998 | Ramsier et al. | 320/106 |
| 5,847,541 A | * | 12/1998 | Hahn | 320/111 |
| 5,926,005 A | * | 7/1999 | Holcomb et al. | 320/113 |
| 6,236,186 B1 | * | 5/2001 | Helton et al. | 320/106 |
| 6,310,465 B2 | * | 10/2001 | Najima | 320/150 |
| 6,377,021 B2 | * | 4/2002 | Duerbaum et al. | 320/107 |
| 7,002,265 B2 | * | 2/2006 | Potega | 307/149 |
| 7,145,314 B2 | * | 12/2006 | Aradachi et al. | 320/150 |
| 7,197,650 B2 | * | 3/2007 | Watanabe et al. | 713/300 |
| 2004/0029426 A1 | * | 2/2004 | Lui et al. | 439/218 |
| 2005/0174094 A1 | * | 8/2005 | Purdy et al. | 320/134 |
| 2006/0027557 A1 | * | 2/2006 | Peterson et al. | 219/386 |

* cited by examiner

*Primary Examiner*—Edward Tso
*Assistant Examiner*—M'Baye Diao
(74) *Attorney, Agent, or Firm*—Bacon & Thomas, PLLC

(57) ABSTRACT

A charging device for use in charging plural types of secondary batteries includes a power source unit for supplying a charging current to an object secondary battery, a battery type signal receiving unit for receiving a battery type signal, a battery temperature signal receiving unit for receiving a battery temperature signal, a blowing unit for blowing an air to the secondary battery, a storage unit for storing reference judging temperatures for determination of charging-incongruent temperatures of the plural types of secondary batteries, in a matching relationship with the types of the secondary batteries, and a control unit. The control unit allows the blowing unit to perform a blowing operation, if the temperature of the secondary battery exceeds a reference judging temperature, and to stop the blowing operation, if otherwise.

15 Claims, 9 Drawing Sheets

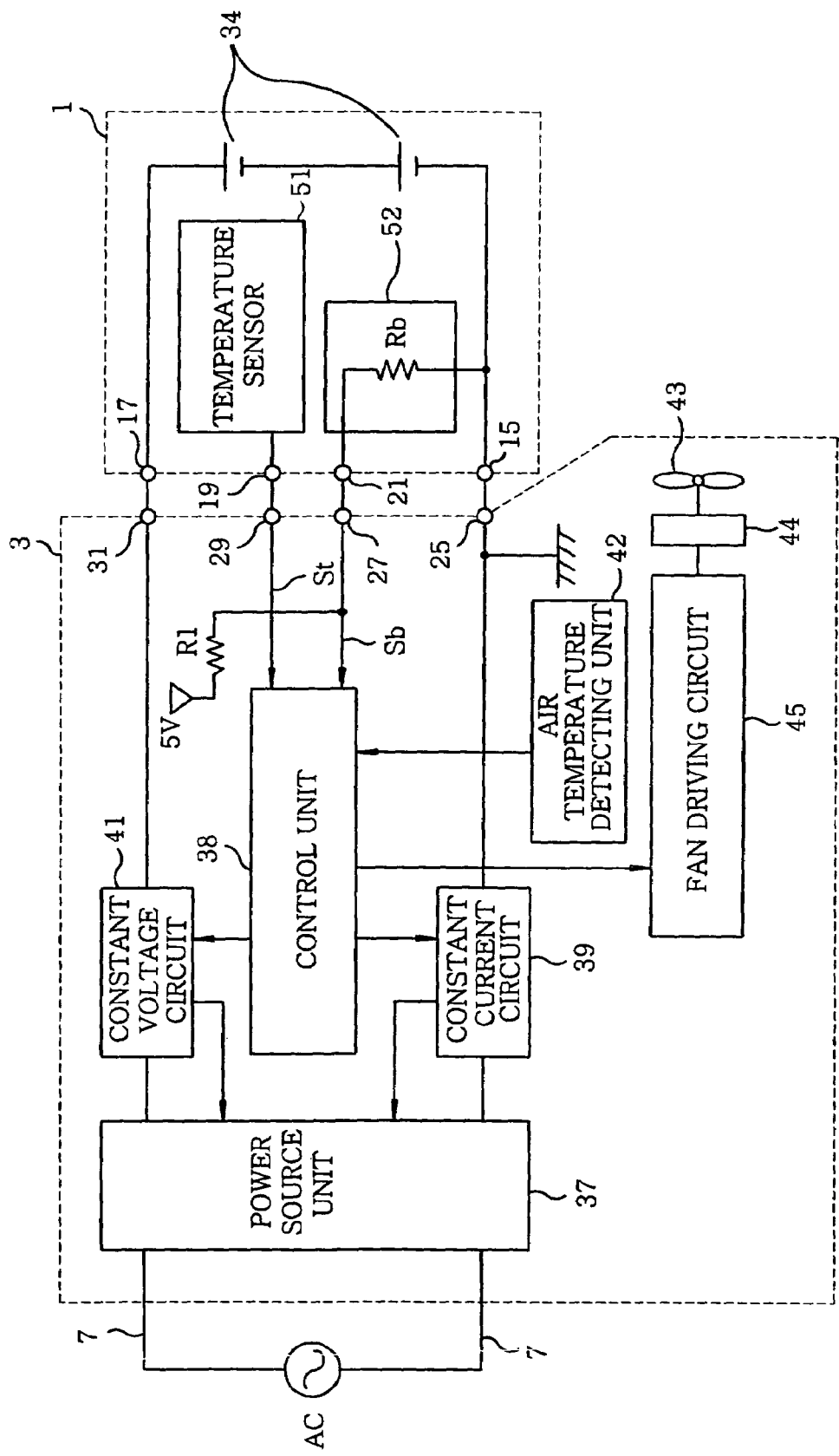

CHARGING DEVICE AND RECHARGEABLE POWER TOOL SET

FIELD OF THE INVENTION

The present invention relates to a charging device for charging plural types of secondary batteries and also to a rechargeable power tool set provided with such a charging device.

BACKGROUND OF THE INVENTION

Conventionally, secondary batteries such as a nickel metal hydride battery or the like have been used as a power source of, e.g., a rechargeable power tool set. The secondary batteries can be recharged within a shortened period of time by increasing a charging current. In this process, however, a great deal of heat is generated thereby raising the temperature of the batteries. This is problematic in that the secondary batteries may suffer from a shortened cycle life.

Thus, the conventionally known charging devices for charging such secondary batteries are provided with a cooling fan that cools down the secondary batteries to thereby restrain any temperature rise of the latter (see, e.g., Japanese Patent Laid-open Publication Nos. 2001-136676 and 2000-312440).

In the meantime, the secondary batteries have a tendency to show a reduced cycle life not only when they are charged at an elevated temperature but also when the charging task is carried out under a super-cooled condition beyond a suitable charging temperature range. The temperature range suitable for battery charging depends on the types of the secondary batteries. Moreover, the secondary batteries exhibit different behaviors depending on their types when the charging operation is performed. For example, a nickel metal hydride battery undergoes an exothermic reaction in which heat is generated along with the charging operation, whereas a lithium-ion or a nickel cadmium secondary battery is subject to an endothermic reaction in which heat is absorbed along with the charging operation.

For the very reason, in the charging device provided with a cooling fan for cooling down the afore-said secondary batteries, if the secondary batteries are cooled regardless of the types thereof, for instance, if the nickel metal hydride battery generating heat when on charge is cooled by the cooling fan in the same manner as applied to the lithium-ion secondary battery absorbing heat when charged, there may be such an instance that the secondary batteries are super-cooled to a temperature unsuitable for charging the same. This may lead to a problematic case that the cycle life of the secondary batteries is reduced by the charging operation.

SUMMARY OF THE INVENTION

In view of the foregoing problems, it is an object of the present invention to provide a charging device that can reduce the possibility of charging a secondary battery under a super-cooled condition regardless of the types thereof and a rechargeable power tool set incorporating the charging device.

In accordance with the present invention, there is provided a charging device for use in charging plural types of secondary batteries, including: a power source unit for supplying a charging current to an object secondary battery; a battery type signal receiving unit for receiving battery type signals indicative of the type of the object secondary battery; a battery temperature signal receiving unit for receiving battery temperature signals indicative of the temperature of the object secondary battery; a blowing unit for blowing an air to the object secondary battery; a storage unit for storing a reference judging temperature for determination of a charging-incongruent temperature of the plural types of secondary batteries, in a matching relationship with the types of the secondary batteries; and a control unit for allowing the blowing unit to perform a blowing operation, if the temperature of the object secondary battery represented by the battery temperature signals received in the battery temperature signal receiving unit exceeds the reference judging temperature stored in the storage unit in a matching relationship with the types of the secondary batteries that are represented by the battery type signals received in the battery type signal receiving unit, and for causing the blowing unit to stop the blowing operation, if otherwise.

BRIEF DESCRIPTION OF THE DRAWINGS

The above and other objects and features of the present invention will become apparent from the following description of preferred embodiments, given in conjunction with the accompanying drawings, in which:

FIGS. 3A to 3C are views illustrating the external configuration of the charging device for use in the tool set shown in FIG. 1A, wherein FIG. 3A is a top view of the charging device, FIG. 3B is a bottom view of the charging device, and FIG. 3C is a top view of the charging device with a battery pack attached thereto;

FIG. 4 is a block diagram showing one exemplary configuration of the battery pack and the charging device in accordance with a first preferred embodiment of the present invention;

FIGS. 7A and 7B are cross-sectional views showing one exemplary configuration of a charging device 3a in accordance with a second preferred embodiment of the present invention wherein FIG. 7A shows a cross-section of a charging device taken along line 7A-7A in FIG. 1B and FIG. 7B depicts a cross-section of the charging device taken along line 7B-7B in FIG. 1B;

DETAILED DESCRIPTION OF THE PREFERRED EMBODIMENTS

Figure 1A:
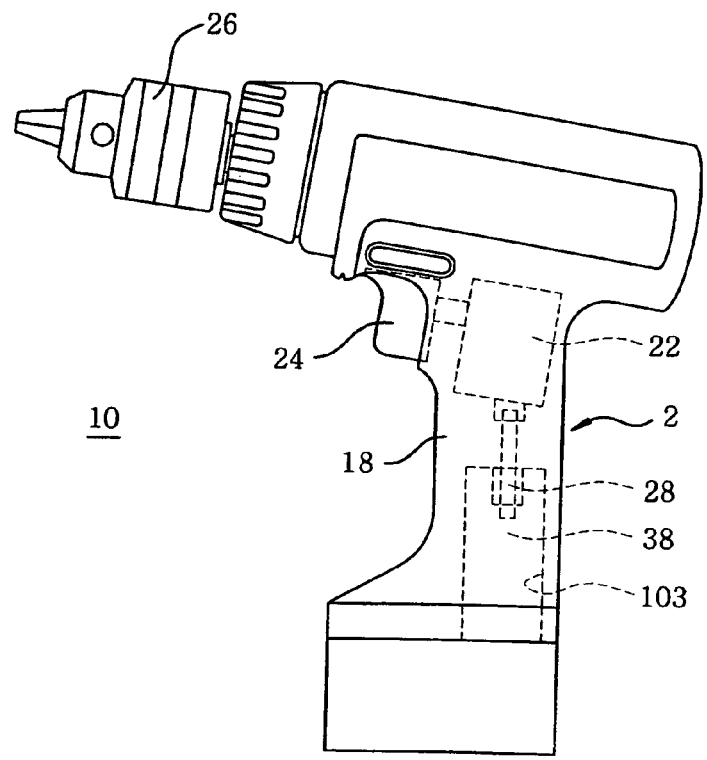
FIGS. 1A and 1B are an overall view showing the external configuration of a rechargeable power tool set in accordance with a first preferred embodiment of the present invention and a perspective view of a charging device in accordance with the first preferred embodiment of the present invention.

Preferred embodiments of the present invention will be described in detail hereinbelow with reference to the accompanying drawings. Throughout the drawings, like parts or components are designated by the same reference numerals, with no duplicate description given in that regard.

First Preferred Embodiment

The present invention will be described in respect of an embodiment where the inventive concept is applied to a power tool by way of example, although there are known a variety of electrical apparatus of the type provided with an apparatus body having a load and a battery pack having a battery for supplying electricity to the load of the apparatus body. Examples of such electrical equipments include a notebook personal computer, a video recorder with a built-in camera, a digital camera, an electric razor and an electric toothbrush.

Figure 1B:
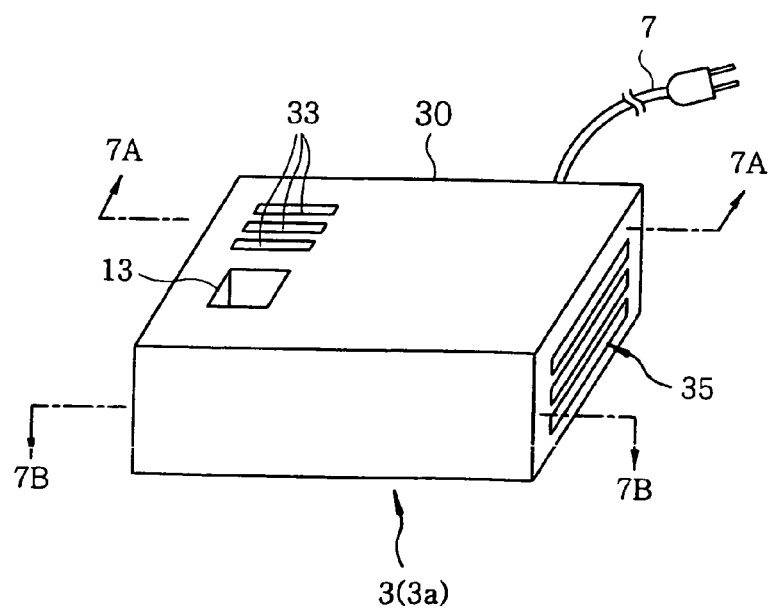
Figure 2:
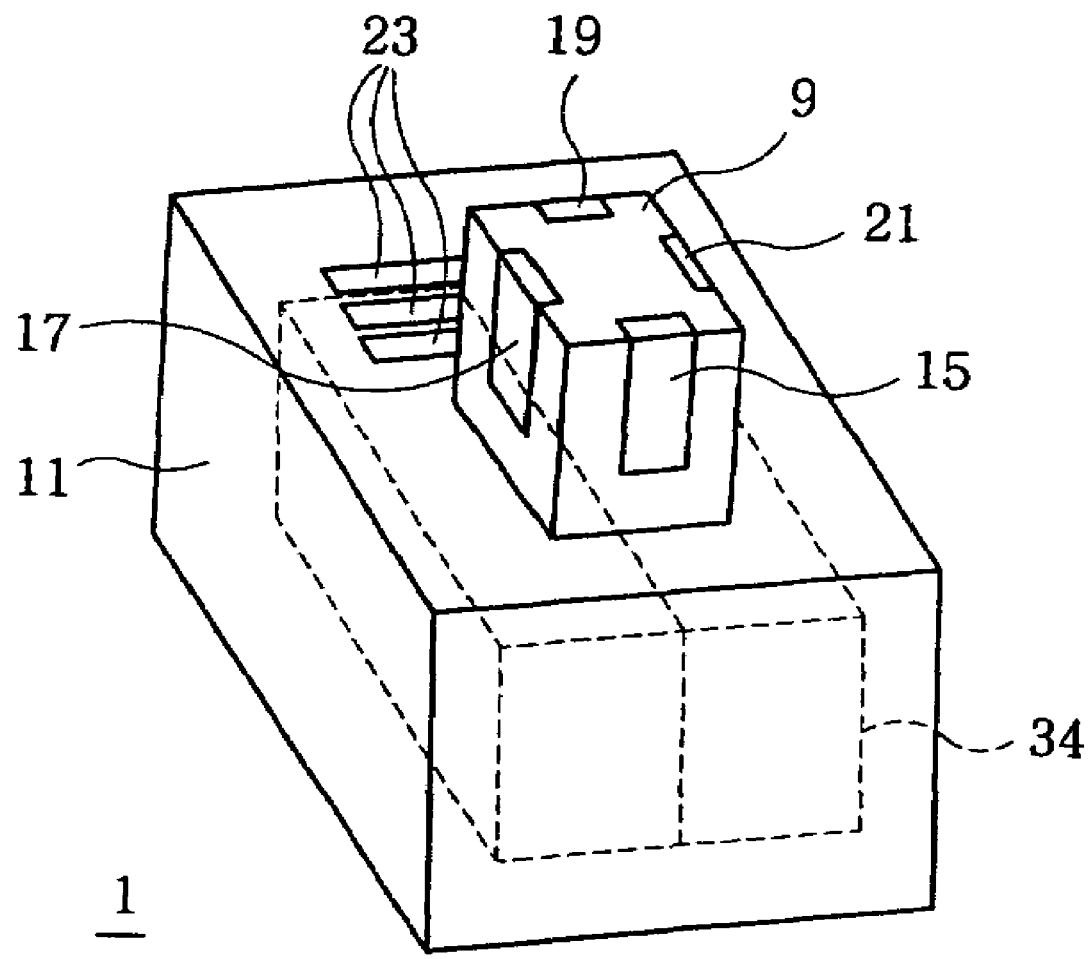
FIG. 2 is a perspective view illustrating the external configuration of a battery pack for use in the tool set shown in FIG. 1A.
Figure 3A:
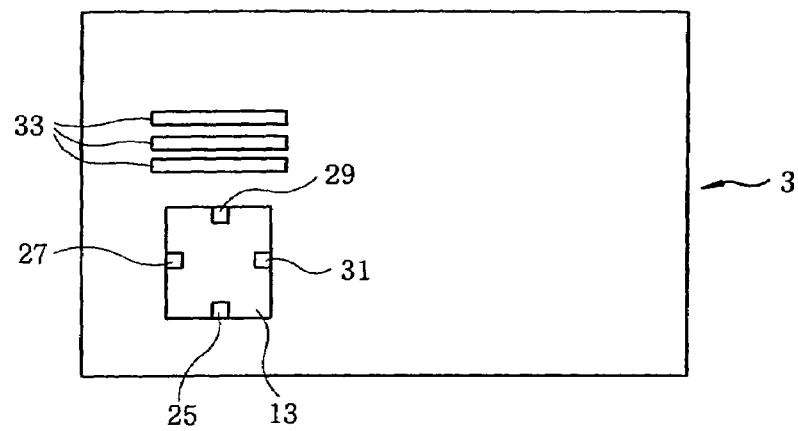
Figure 3B:
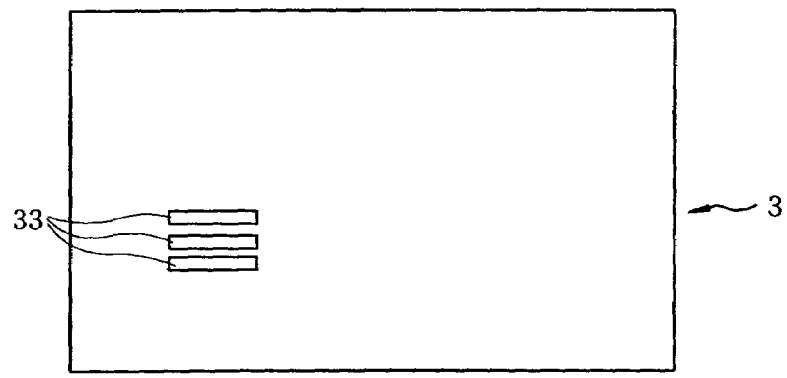
Figure 3C:
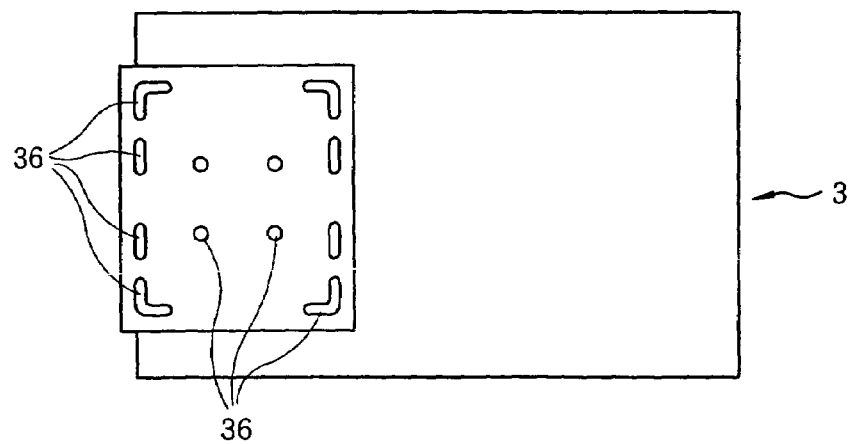

FIGS. 1A and 1B are an overall view showing the external configuration of a rechargeable power tool set in accordance with a first preferred embodiment of the present invention and a perspective view of a charging device in accordance with the first preferred embodiment of the present invention. FIG. 2 is a perspective view illustrating the external configuration of a battery pack for use in the tool set shown in FIG. 1A. FIGS. 3A to 3C are views illustrating the external configuration of the charging device for use in the tool set shown in FIG. 1A, wherein FIG. 3A is a top view of the charging device, FIG. 3B is a bottom view of the charging device, and FIG. 3C is a top view of the charging device with a battery pack attached thereto.

Referring to FIG. 1A, a rechargeable power tool set 10 includes a power tool main body 2 forming a rechargeable drill driver, one example of electrically-driven tools, a battery pack 1 mounted on the power tool main body 2, and a charging device 3 for charging the battery pack 1.

The power tool main body 2 includes a housing 18, a mounting part 20 formed inside a grip portion of the housing 18 for removably receiving the battery pack 1 as a motor 22 disposed within the housing 18 and driven by an electric current supplied from the battery pack 1, a trigger switch 24 provided on the grip portion of the housing 18 for ON/OFF controlling the electric current supplied to the motor 22, and a rotating part 26 provided at the tip end of the housing 18 for holding a drill bit or the like. On the innermost end of the mounting part 20, there are attached a pair of electrodes 28 which in turn make a connection with the motor 22.

As shown in FIG. 2, the battery pack 1 includes a housing 11 receiving therein a secondary battery 34 or the like and a connector portion 9 protruding from one surface of the housing 11 for engagement with the mounting part 20 of the power tool main body 2. Disposed at the flank sides of the connector portion 9 are electrodes 15, 17, 19 and 21 that remain exposed to the outside. Among these electrodes, the electrodes 15 and 17 are connected to the secondary battery 34 and, when the connector portion 9 comes into engagement with the mounting part 20 of the power tool main body 2, press-contacted with the pair of electrodes 28 of the mounting part 20. Also shown in FIG. 1A is the condition wherein the battery pack 1 is attached to the mounting part 20 of the power tool main body 2.

The charging device 3 shown in FIG. 1B includes a generally box-like housing 30, a power supply line 7 connected to a commercial power source of, e.g., AC 100V, and a recessed connector portion 13 formed on the top surface of the generally box-like housing 30, into which the connector portion 9 of the battery pack 1 can be inserted. Referring to FIG. 3A, disposed on the inner side surfaces of the recessed connector portion 13 are electrodes 25, 27, 29 and 31 that come into contact with, and make an electrical connection with, the electrodes 15, 17, 19 and 21 of the connector portion 9. At the time when the battery pack 1 is mounted on the charging device 3, the electrodes 15, 17, 19 and 21 are adapted to be press-contacted with the electrodes 25, 27, 29 and 31. And, by way of example, the electrodes 17 and 31 are positive charging electrodes, the electrodes 15 and 25 are negative charging electrodes (grounds for the circuit), the electrodes 19 and 29 are electrodes for transmitting battery temperature signals St indicative of the temperature of the secondary battery 34, and the electrodes 21 and 27 are electrodes for transmitting battery type signals Sb indicative of the type of the secondary battery 34. In this case, the electrode 27 serves as one example of a battery type signal receiving unit and the electrode 29 functions as one example of a battery temperature signal receiving unit.

The charging device 3 is unable to conduct the charging operation if the battery pack 1 is not mounted on the charging device 3 but can perform the charging operation once the battery pack 1 is mounted on the charging device 3. The battery pack 1 and the charging device 3 are respectively provided with vent holes 23 and 33 of, e.g., a slit shape, on their surfaces that will be mutually confronting when they are combined together. Further, as depicted in FIG. 3C, vent holes 36 are provided on opposite side of the housing 11 of the battery pack 1 from the side confronting the charging device 3. In addition, as illustrated in FIG. 3B, vent holes 32 of a slit shape are formed on the bottom surface confronting the vent holes 33 in the housing 30 of the charging device 3. Referring back to FIG. 1B, vent holes 35 of a slit shape are provided on a side surface of the housing 30 and serve to dissipate the heat generated in the charging device 3 to the outside.

The charging device 3 contains therein a fan 43 set forth later, wherein the fan 43 is adapted to draw an air and supply it to the secondary battery 34 within the battery pack 1 through the vent holes 32, 33 and 23 in this order when charged. The air is then discharged to the outside via the vent holes 36.

FIG. 4 is a block diagram showing one exemplary electrical configuration of the battery pack 1 and the charging device 3 when they are combined together. The battery pack 1 shown in FIG. 4 includes the secondary battery 34, a temperature sensor 51 (a battery temperature detecting unit) and a battery type signal generating unit 52. The charging device 3 includes a power source unit 37, a control unit 38, a constant current circuit 39, a constant voltage circuit 41, an air temperature detecting unit 42, a fan (a blowing unit) 43, a motor 44 for rotating the fan 43, and a fan driving circuit 45 for controlling the rotation of the motor 44 in response to control signals from the control unit 38.

The secondary battery 34 may be, for example, a nickel metal hydride battery, a lithium-ion secondary battery, a nickel cadmium secondary battery or other secondary batteries. The anode of the secondary battery 34 is connected to the electrode 17 and the cathode thereof is connected to the electrode 15. The electrode 17 is connected to the constant voltage circuit 41 through the electrode 31 and the electrode 15 is connected to the constant current circuit 39 through the electrode 25.

The temperature sensor 51 may be a temperature sensor such as a thermocouple or a thermistor, for example, and is adapted to sense the temperature of the secondary battery 34 and then feed battery temperature signals St indicative of the sensed temperature to the control unit 38 via the electrodes 19 and 29.

The battery type signal generating unit 52 is a circuit unit that supplies battery type signals Sb indicative of the type of the secondary battery 34 to the control unit 38 by way of the electrodes 21 and 27. For example, the battery type signal generating unit 52 is comprised of a resistor Rb lying between the electrodes 15 and 21. The resistor Rb exhibits a varying resistance value depending on the type of the secondary battery 34, for example, 10 kΩ in case of the lithium-ion secondary battery, 20 kΩ in case of the nickel cadmium secondary battery and 30 kΩ in case of the nickel metal hydride battery.

And, the electrode 27 is connected to a circuit operating power source having a voltage of 5V through, e.g., a resistor R1 of 10 kΩ. Based on the voltage dividing ratio of the resistor R1 and the resistor Rb, the battery type signals Sb have a voltage of 2.5V in case of the lithium-ion secondary battery, 3.3V in case of the nickel cadmium secondary battery and 3.75V in case of the nickel metal hydride battery.

The power source unit 37 may be, for example, a power source circuit comprised of an AC-DC converter, and serves to covert the alternating current voltage supplied from a commercial power source connected thereto through the power source line 7 to a direct current voltage. Responsive to control signals from the control unit 38, the constant current circuit 39 serves to regulate the charging current for the secondary battery 34 supplied from the power source unit 37 to the battery pack 1. In response to the control signals from the control unit 38, the constant voltage circuit 41 functions to regulate the charging voltage for the secondary battery 34 supplied from the power source unit 37 to the battery pack 1.

The air temperature detecting unit 42 is a temperature sensor that detects the temperature of the air blown to the secondary battery 34 by the fan 43 and feeds it to the control unit 38. The air temperature detecting unit 42 may be, for example, a thermocouple or a thermistor provided in the vicinity of the fan 43.

The control unit 38 includes, for example, a CPU (Central Processing Unit) for executing a prescribed operational processing, a ROM (Read Only Memory) as a non-volatile storage element in which a predetermined control program is stored, a RAM (Random Access Memory) as a volatile storage element for temporarily storing data, and an A/D converter for converting the battery temperature signals St or the battery type signals Sb to digital ones. By executing the control program stored in the ROM, the control unit 38 issues control signals to the constant current circuit 39 and the constant voltage circuit 41 to thereby control the charging operation of the secondary battery 34 or feeds the control signals to the fan driving circuit 45 to thereby control the blowing operation of the fan 43.

Figure 5:
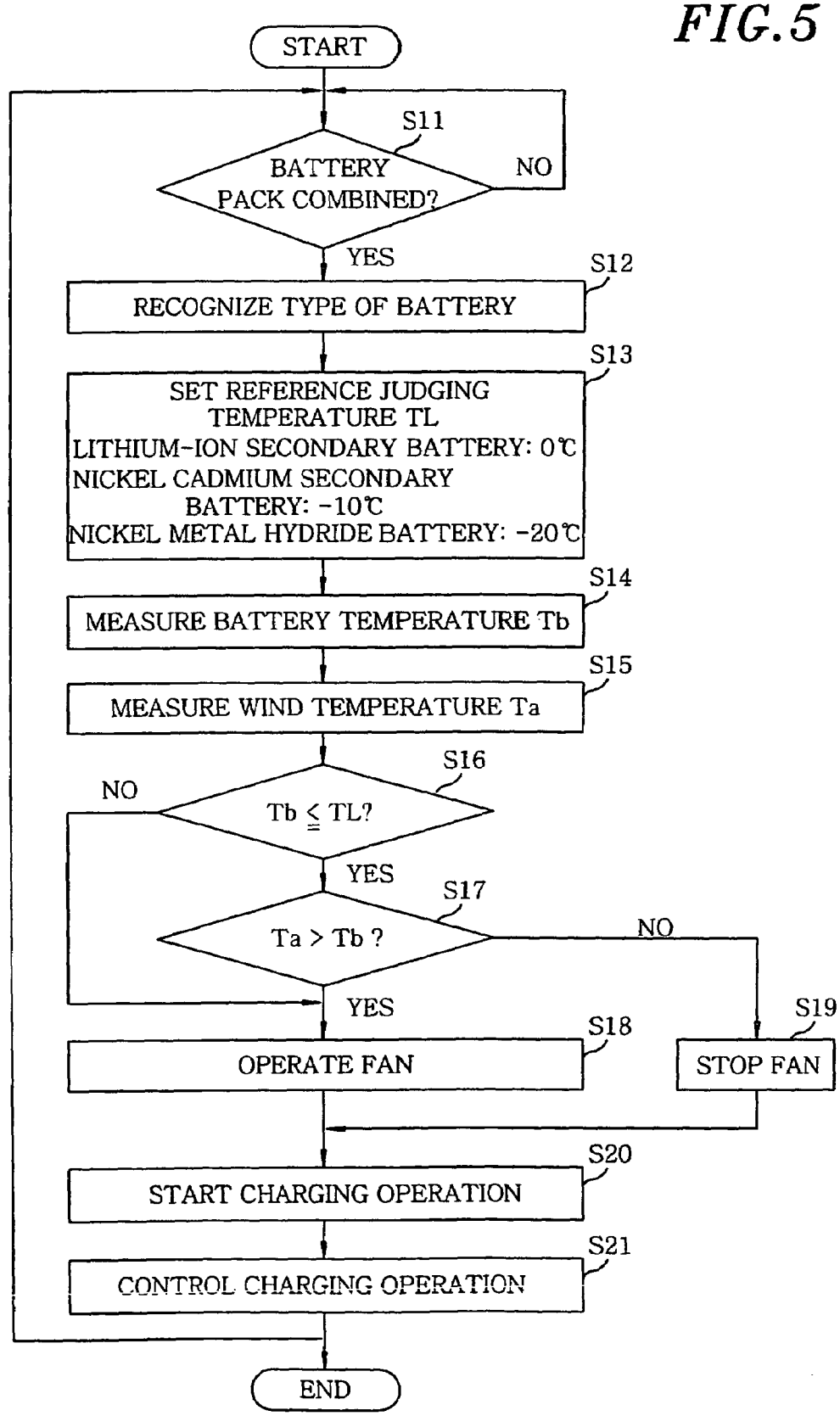
FIG. 5 is a flowchart illustrating one exemplary charging operation at the time when the battery pack and the charging device are combined together.

Now, description will be given as for the charging operation at the time when the battery pack 1 and the charging device 3 are combined together. FIG. 5 is a flowchart illustrating one exemplary charging operation in the event that the battery pack 1 and the charging device 3 are combined together. Initially, when the battery pack 1 and the charging device 3 are not combined, the electrode 27 remains open such that the battery type signals Sb is pulled up to 5V by the resistor R1 and inputted to the control unit 38.

If the battery pack 1 and the charging device 3 are combined together, the electrode 27 is press-contacted with the electrode 21, thus allowing the resistor R1 and the resistor Rb to form a serial circuit. Consequently, the battery type signals Sb have a voltage divided by the resistor R1 and the resistor Rb, meaning that the battery type signals Sb undergo a voltage drop. Then, the control unit 38 detects the voltage drop of the battery type signals Sb and recognizes that the battery pack 1 has been combined with the charging device 3 (YES at step S11), thereby shifting the flow to step S12.

Subsequently, based on the voltage of the battery type signals Sb, the type of the secondary battery 34 is recognized by the control unit 38 (step S12). For instance, the control unit 38 recognizes the type of the secondary battery 34 in such a fashion that the battery type signals Sb of 2.5V is regarded as the lithium-ion secondary battery, 3.3V as the nickel cadmium secondary battery, and 3.75V as the nickel metal hydride battery.

Then, based on the type of the secondary battery 34 recognized at step S12, the control unit 38 sets a reference judging temperature TL for determination of charging-incongruent temperature of the respective types of secondary batteries (step S13). The reference judging temperature TL may be, for example, the temperature at which the electrolytic solution of the respective types of secondary batteries is frozen. In case of the lithium-ion secondary battery, the reference judging temperature TL is set to fall within the range of 0° C.~+10° C., e.g., to become 0° C. In case of the nickel cadmium secondary battery, the reference judging temperature TL is set to fall within the range of −10° C.~0° C., e.g., to become −10° C. In case of the nickel metal hydride battery, the reference judging temperature TL is set to fall within the range of −20° C.~−10° C., e.g., to become −20° C.

In this instance, the ROM of the control unit 38 that stores the control program acts as one example of the storage unit. Further, in addition to the control program, the ROM may store beforehand an LUT (a look-up table) prepared by matching the plural types of secondary batteries with the reference judging temperature TL of the respective types of secondary batteries.

Then, the temperature of the secondary battery 34 is detected by the temperature sensor 51 and the battery temperature signals St indicative of the temperature detected are fed to the control unit 38 by way of the electrodes 19 and 29. Based on the battery temperature signals St, the battery temperature Tb of the secondary battery 34 is acquired by the control unit 38 (step S14).

Thereafter, the air temperature detecting unit 42 measures a wind temperature Ta, namely, the temperature of the air in the vicinity of the fan 43. Signals indicative of the wind temperature Ta are fed to the control unit 38 so that the control unit 38 can acquire the wind temperature Ta (step S15).

And, the control unit 38 compares the battery temperature Tb and the reference judging temperature TL (step 16). If the battery temperature Tb exceeds the reference judging temperature TL (NO at step S16), the flow proceeds to step S18 where an air is blown to the secondary battery 34. In contrast, if the battery temperature Tb is equal to or smaller than the reference judging temperature TL (YES at step S16), the wind temperature Ta is compared with the battery temperature Tb (at step S17). If the wind temperature Ta exceeds the battery temperature Tb (YES at step S17), the flow proceeds to step S18 where the secondary battery 34 is warmed up. In contrast, if the wind temperature Ta is equal to or smaller than the battery temperature Tb (NO at step S17), the control unit 38 outputs control signals for stopping the rotation of the fan 43 to the fan driving circuit so as to avoid the super-cooling of the secondary battery 34. Thus, the fan driving circuit 45 stops the rotation of the motor 44 whereby the fan 43 is stopped, so that no super-cooling of the secondary battery 34 takes place (step S19). Then the flow proceeds to step S20 where the charging operation is started.

Subsequently, at step S18, the control unit 38 feeds to the fan driving circuit 45 control signals causing the fan 43 to rotate, in response to which the fan driving circuit 45 enables the motor 44 to rotate, thereby blowing the air drawn from the vent holes 32 to the secondary battery 34 through the vent holes 33 and the vent holes 23 (step S18).

In this regard, the stop condition of the fan 43 at step S19 should be construed to encompass the condition that the fan 43 is rotated at a speed low enough not to super-cool the secondary battery 34, for example, at a speed producing a wind in the amount of about one tens of the wind amount produced by the fan 43 at step S18. There may be such an instance that the secondary battery 34 emits gases in the charging process. For example, the nickel metal hydride battery generates hydrogen gases as it is over-charged. In this instance, by rotating the fan 43 at a low speed to blow a gentle wind to the secondary battery 34 while maintaining the reduced cooling effect, it becomes possible to exhaust the gas emitted from the secondary battery 34 to the outside through the vent holes 36 of the battery pack 1.

Then, at step S20, the power source unit 37 supplies an electric current for charging the secondary battery 34 in response to the control signals from the control unit 38, thus starting the charging operation. The charging voltage outputted from the power source unit 37 is regulated by the constant voltage circuit 41 and the charging current outputted from the power source unit 37 is regulated by the constant current circuit 39, thus controlling the charging operation (step S21). Even in the ongoing process of charging the secondary battery 34, the operations of steps S11 to S21 are repeatedly carried out to thereby reduce the possibility of super-cooling the secondary battery 34.

Through the processes of steps S11 to S21 noted above, the reference judging temperature TL is set depending on the type of the secondary battery 34. If the battery temperature Tb exceeds the reference judging temperature TL, the blowing operation is conducted by the fan 43 to cool down the secondary battery 34. If the battery temperature Tb is equal to or smaller than the reference judging temperature TL and if the wind temperature Ta is equal to or smaller than the battery temperature Tb, the fan 43 stops its rotation to avoid any super-cooling of the secondary battery 34. In the meantime, if the battery temperature Tb is equal to or smaller than the reference judging temperature TL and if the wind temperature Ta exceeds the battery temperature Tb, the fan 43 blows the air to warm up the secondary battery 34. This can reduce the possibility of charging the secondary battery under a super-cooled condition, regardless of the type of the secondary battery.

Further, thank to the fact that the fan 43 blows the air to warm up the secondary battery 34 if the battery temperature Tb is equal to or smaller than the reference judging temperature TL and if the wind temperature Ta exceeds the battery temperature Tb, it is possible to shorten the time taken in raising the battery temperature Tb to a temperature suitable for the charging operation, i.e., to a temperature greater than the reference judging temperature TL.

Not infrequently, the power tool main body 2 carrying the battery pack 1 is used in outdoor areas such as a construction site, a working place and the like or kept out of the house. The battery pack 1 exposed to the outdoor air and cooled down to a low temperature in this manner will be mounted on and charged by the charging device 3 in a warm indoor atmosphere. In such a case, the air temperature in the vicinity of the charging device 3, i.e., the wind temperature Ta, is higher than the battery temperature Tb of the secondary battery 34 in the battery pack 1. Accordingly, the secondary battery 34 can be warmed up by conducting the blowing operation with the fan 43.

Figure 6:
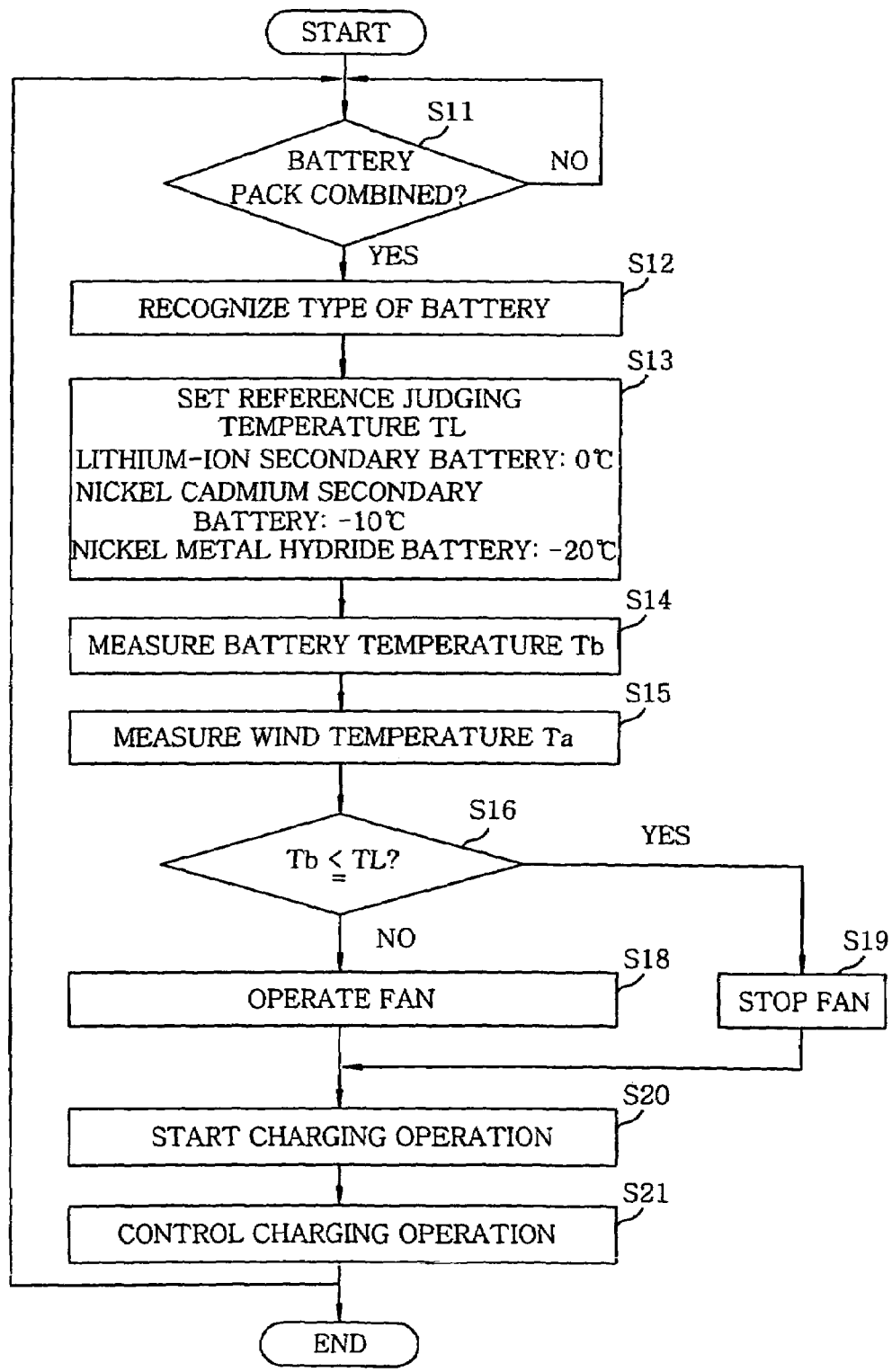
FIG. 6 is a flowchart illustrating another exemplary charging operation at the time when the battery pack and the charging device are combined together.

Alternatively, as illustrated in FIG. 6, step S17 of comparing the wind temperature Ta with the battery temperature Tb may be omitted. In this case, if the battery temperature Tb exceeds the reference judging temperature TL (NO at step S16), the flow proceeds to step S18 where the secondary battery 34 is cooled down. If, however, the battery temperature Tb is equal to or smaller than the reference judging temperature TL (YES at step S16), the flow proceeds to step S19 where the fan 43 stops its rotation to avoid any super-cooling of the secondary battery 34.

Second Preferred Embodiment

Figure 7A:
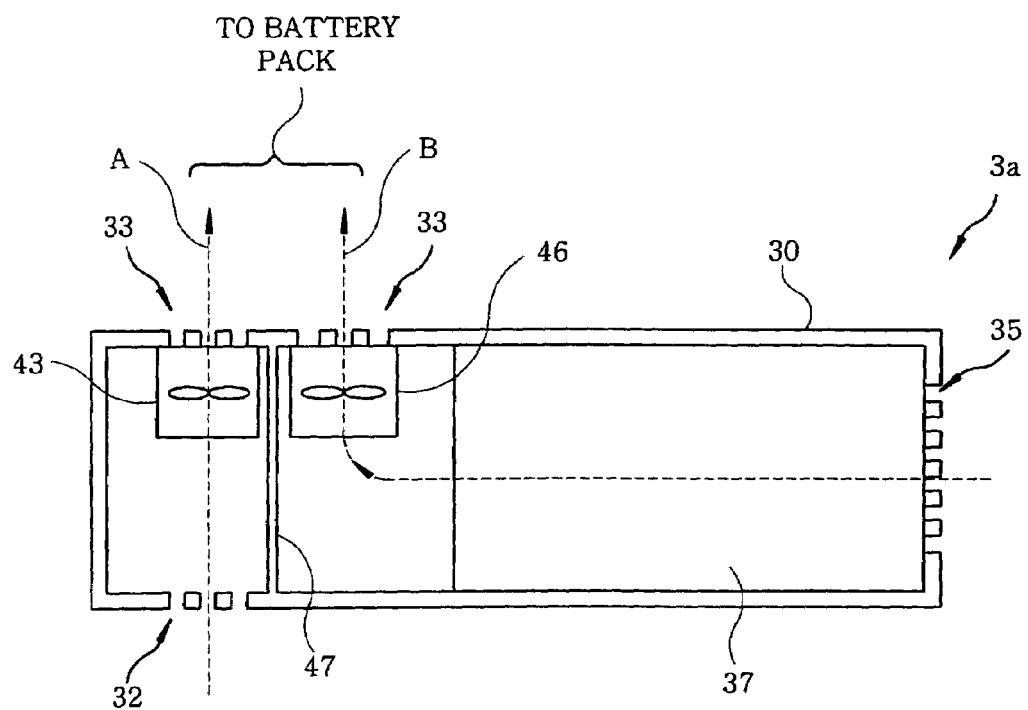
Figure 7B:
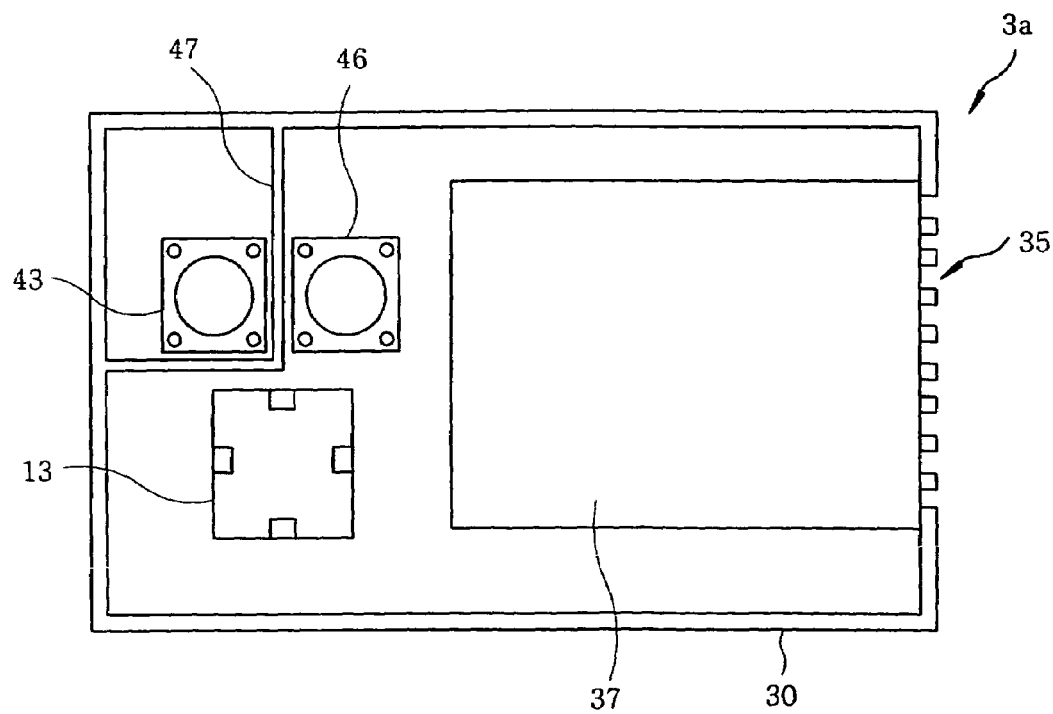
Figure 8:
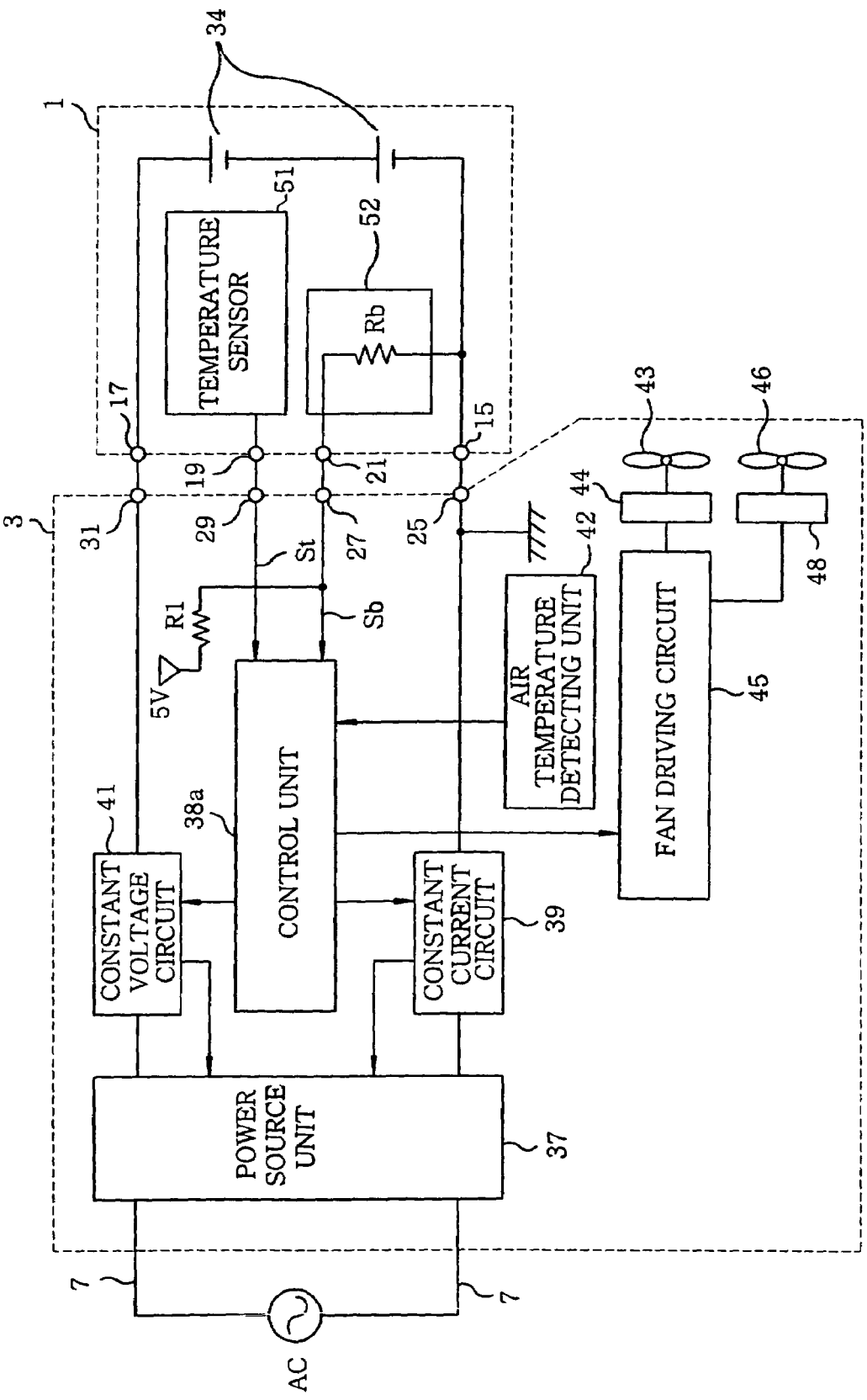
FIG. 8 is a block diagram illustrating one exemplary configuration of the charging device shown in FIG. 7B.

Now, description will be offered regarding the charging device for use in the rechargeable power tool set in accordance with a second preferred embodiment of the present invention. FIGS. 7A and 7B are cross-sectional views showing one exemplary configuration of a charging device 3*a* in accordance with a second preferred embodiment of the present invention. Specifically, FIG. 7A shows a cross-section of the charging device 3*a* taken along line 7A-7A in FIG. 1B, whereas FIG. 7B depicts a cross-section of the charging device 3*a* taken along line 7B-7B in FIG. 1B. FIG. 8 is a block diagram illustrating one exemplary configuration of the charging device 3*a* shown in FIG. 7A or 7B.

The charging device 3*a* illustrated in FIGS. 7A and 7B differs from the charging device 3 in accordance with the first preferred embodiment of the present invention in the following aspects. Specifically, the charging device 3*a* illustrated in FIG. 7 is further provided with a fan 46 in addition to the fan 43. And, a partition wall 47 is formed between the fan 43 and the fan 46.

Thus, as the fan 43 rotates, the air introduced through the vent holes 32 is blown to the battery pack 1 through the vent holes 33 along the air flow route A shown by a broken line. If the fan 46 begins to rotate, the air introduced through the vent holes 35 is blown to the battery pack 1 through the internal space of the power source unit 37 and then the vent holes 33 along the air flow route B shown by a broken line. In this regard, the fan 43 and the fan 46 cooperate to form one example of the blowing unit, and the power source unit 37 plays a role of an air-warming unit.

Figure 9:
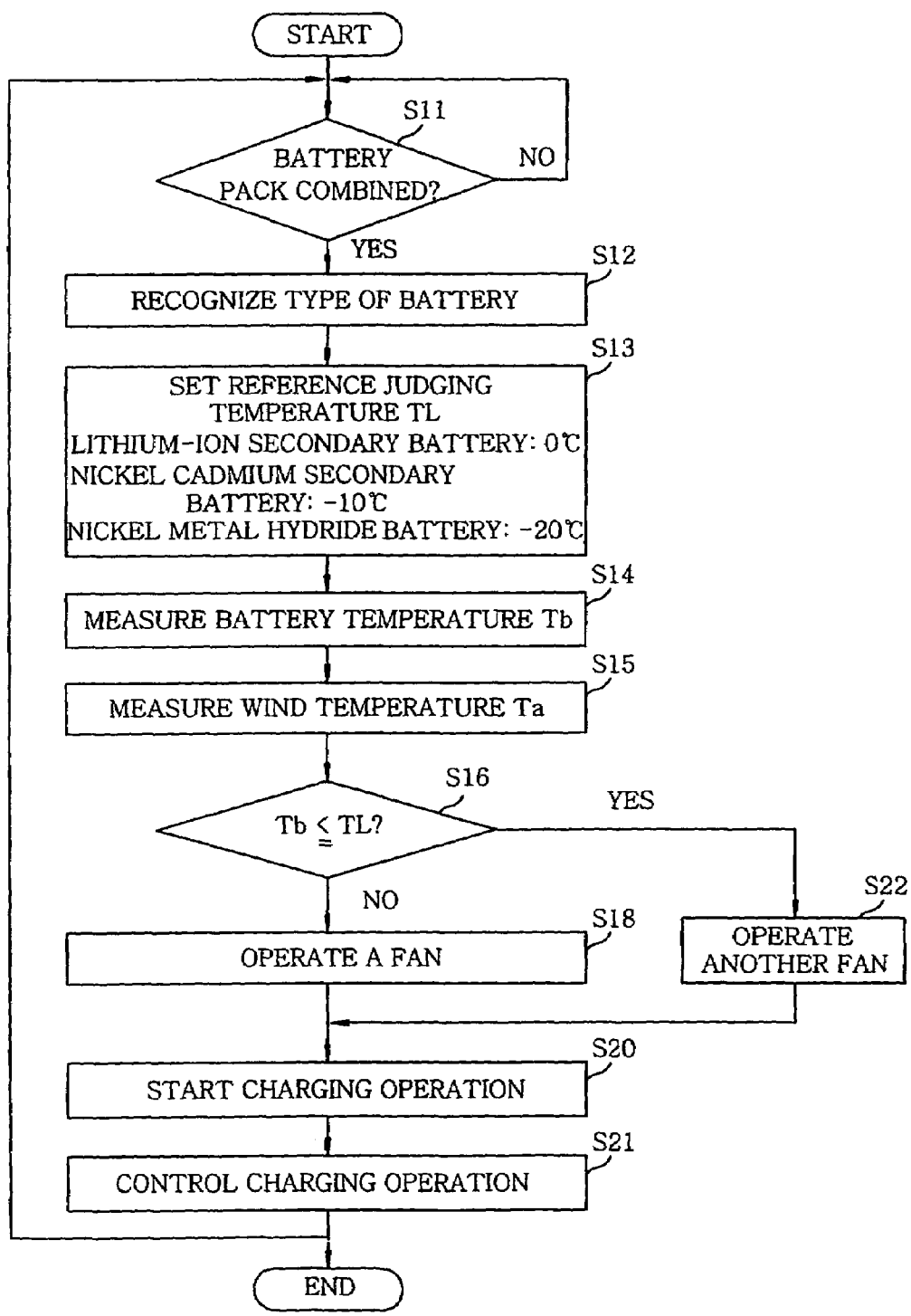
FIG. 9 is a flowchart illustrating one exemplary charging operation of the charging device shown in FIG. 8.

Further, excepting that the control unit 38*a* operates differently as set forth later, the charging device 3*a* illustrated in FIG. 8 has the same configuration as that of the charging device 3 shown in FIG. 4. Therefore, no description is given in respect of the same configuration. Now, operations of the charging device 3*a* in accordance with the second preferred embodiment will be described in detail. The flowchart illustrated in FIG. 9 differs from the one shown in FIG. 6 in that, at step S22, the fan 46 is operated instead of stopping the fan 43.

Other operations than this are the same as previously set forth with regard to the flowchart shown in FIG. 6 and need no duplicate description. Operation at step S22 as follows. Initially, at step S16, if the battery temperature Tb is determined to exceed the reference judging temperature TL (NO at step S16), the flow proceeds to step S18 where the air is blown to the secondary battery 34. If, however, the battery temperature Tb is equal to or smaller than the reference judging temperature TL (YES at step S16), the control unit 38*a* feeds to the fan driving circuit 45 the signals prompting the fan 46 to rotate and warm up the secondary battery 34. In response, the fan driving circuit 45 rotates the motor 48 in such a manner that the air introduced through the vent holes 35 is blown by the fan 46 to the secondary battery 34 through the internal space of the power source unit 37, the vent holes 33 and then the vent holes 23 of the battery pack 1 (step S22).

In view of the fact that the power source unit 37 generates heat by the loss of an electric power in the process of converting an alternating current voltage to a direct current voltage, the air introduced through the vent holes 35 is warmed up as it passes through the internal space of the power source unit 37. The fan 46 blows the warmed-up air to the secondary battery 34 via the vent holes 33 and the vent holes 23. In this way, not only is it possible to warm up the secondary battery 34 but also possible to shorten the time taken in raising the battery temperature Tb to a temperature suitable for the charging operation, i.e., to a temperature greater than the reference judging temperature TL.

As an alternative, a separate heater may be provided to warm up the air blown to the secondary battery 34, instead of using the power source unit 37 as an air-warming unit.

As described in the foregoing, according to the charging device and the rechargeable power tool set of the present invention, the blowing unit is adapted to perform the blowing operation, if the temperature of the object secondary battery detected by the battery temperature detecting unit exceeds the reference judging temperature stored in the storage unit in a matching relationship with the types of the secondary batteries detected by the battery type detecting unit, but stop the blowing operation, if otherwise. Thank to these features, the blowing unit can operate based on the reference judging temperature which depends on the types of the secondary batteries. In other words, the blowing unit performs the blowing operation to cool down the object secondary battery if the battery temperature exceeds the reference judging temperature, whereas the blowing unit stops the blowing operation to avoid any super-cooling of the object secondary battery if the battery temperature is equal to or smaller than the reference judging temperature. This can reduce the possibility of charging the secondary battery under a super-cooled condition, regardless of the type of the secondary battery.

While the invention has been shown and described with respect to the preferred embodiments, it will be understood by those skilled in the art that various changes and modification may be made without departing from the spirit and scope of the invention as defined in the following claims.

What is claimed is:

1. A charging device for use in charging plural types of secondary batteries, comprising:
   a power source unit for supplying a charging current to an object secondary battery;
   a battery type signal receiving unit for receiving a battery type signal indicative of the type of the object secondary battery;
   a battery temperature signal receiving unit for receiving a battery temperature signal indicative of a temperature of the object secondary battery;
   a blowing unit for blowing an air to the object secondary battery;
   a storage unit storing reference judging temperatures for determination of charging-incongruent temperatures of the plural types of secondary batteries, in a matching relationship with the types of the secondary batteries; and
   a control unit;
   wherein the control unit is configured to cause the blowing unit to perform a cooling operation if the temperature of the object secondary battery represented by the battery temperature signal received in the battery temperature signal receiving unit exceeds a reference judging temperature stored in the storage unit in a matching relationship with the type of the object secondary battery that is represented by the battery type signal received in the battery type signal receiving unit, and
   wherein the control unit is configured to cause the blowing unit to stop the cooling operation if the temperature of the object secondary battery represented by the battery temperature signal received in the battery temperature signal receiving unit is less than or equal to the reference judging temperature.

2. A charging device for use in charging plural types of secondary batteries, comprising:
   a power source unit for supplying a charging current to an object secondary battery;
   a battery type signal receiving unit for receiving a battery type signal indicative of the type of the object secondary battery;
   a battery temperature signal receiving unit for receiving a battery temperature signal indicative of a temperature of the object secondary battery;
   a blowing unit for blowing an air to the object secondary battery;
   a storage unit storing reference judging temperatures for determination of charging-incongruent temperatures of the plural types of secondary batteries, in a matching relationship with the types of the secondary batteries;
   an air temperature detecting unit for detecting a temperature of the air blown by the blowing unit; and
   a control unit for allowing the blowing unit to perform a blowing operation, if the temperature of the air detected by the air temperature detecting unit is higher than the temperature of the object secondary battery represented by the battery temperature signal received in the battery temperature signal receiving unit and the temperature of the object secondary battery represented by the battery temperature signal received in the battery temperature signal receiving unit is equal to or lower than a reference judging temperature stored in the storage unit in a matching relationship with the type of the object secondary battery that is represented by the battery type signal received in the battery type signal receiving unit, and for causing the blowing unit to stop the blowing operation, if the temperature of the air is equal to or lower than the temperature of the object secondary battery and the temperature of the object secondary battery is equal to or lower than the reference judging temperature.

3. A charging device for use in charging plural types of secondary batteries, comprising:
   a power source unit for supplying a charging current to an object secondary battery;
   a battery type signal receiving unit for receiving a battery type signal indicative of the type of the object secondary battery;
   a battery temperature signal receiving unit for receiving a battery temperature signal indicative of a temperature of the object secondary battery;
   a first blowing unit for blowing an external air to the object secondary battery;
   a storage unit storing reference judging temperatures for determination of charging-incongruent temperatures of the plural types of secondary batteries, in a matching relationship with the types of the secondary batteries;
   an air-warming unit for warming up an air;
   a second blowing unit for blowing the air warmed up by the air-warming up unit to the object secondary battery; and
   a control unit;
   wherein the control unit is configured to cause the first blowing unit to blow the external air, if the temperature of the object secondary battery represented by the battery temperature signal received in the battery temperature signal receiving unit exceeds a reference judging temperature stored in the storage unit in a matching relationship with the type of the object secondary battery that is represented by the battery type signal received in the battery type signal receiving unit, and wherein the control unit is configured to cause the second blowing unit to blow the warmed-up air to the object secondary battery, if the temperature of the object secondary battery represented by the battery temperature signal received in the batter temperature signal receiving unit is less than or equal to the reference judging temperature.

4. The charging device of claim 3, wherein the power source unit is used as the air-warming unit.

5. A rechargeable power tool set comprising the charging device of claim 1.

6. A rechargeable power tool set comprising the charging device of claim 2.

7. A rechargeable power tool set comprising the charging device of claim 3.

8. A rechargeable power tool set comprising the charging device of claim 4.

9. The rechargeable power tool set of claim 5, further comprising:

a power tool main body with a motor; and a battery pack including the object secondary battery mounted on the power tool main body for supplying an electric current to the motor, a battery type signal generating unit for generating the battery type signal indicative of the type of the object secondary battery, and a battery temperature detecting unit for detecting the temperature of the object secondary battery to generate the battery temperature signal indicative of the battery temperature detected, wherein the charging device performs a charging operation with respect to the battery pack.

10. The rechargeable power tool set of claim 6, further comprising:

a power tool main body with a motor; and a battery pack including the object secondary battery mounted on the power tool main body for supplying an electric current to the motor, a battery type signal generating unit for generating the battery type signal indicative of the type of the object secondary battery, and a battery temperature detecting unit for detecting the temperature of the object secondary battery to generate the battery temperature signal indicative of the battery temperature detected, wherein the charging device performs a charging operation with respect to the battery pack.

11. The rechargeable power tool set of claim 7, further comprising:

a power tool main body with a motor; and a battery pack including the object secondary battery mounted on the power tool main body for supplying an electric current to the motor, a battery type signal generating unit for generating the battery type signal indicative of the type of the object secondary battery, and a battery temperature detecting unit for detecting the temperature of the object secondary battery to generate the battery temperature signal Indicative of the battery temperature detected, wherein the charging device performs a charging operation with respect to the battery pack.

12. The rechargeable power tool set of claim 8, further comprising:

a power tool main body with a motor; and a battery pack including the object secondary battery mounted on the power tool main body for supplying an electric current to the motor, a battery type signal generating unit for generating the battery type signal indicative of the type of the object secondary battery, and a battery temperature detecting unit for detecting the temperature of the object secondary battery to generate the battery temperature signal indicative of the battery temperature detected, wherein the charging device performs a charging operation with respect to the battery pack.

13. The charging device of claim 1, wherein the battery type signal is generated by using a resistance value depending on the type of the secondary battery.

14. The charging device of claim 2, wherein the battery type signal is generated by using a resistance value depending on the type of the secondary battery.

15. The charging device of claim 3, wherein the battery type signal is generated by using a resistance value depending on the type of the secondary battery.

* * * * *